2,967,789
Patented Jan. 10, 1961

2,967,789

PROCESS OF COATING GRANULES WITH PHENOL-ALDEHYDE RESIN

Howard E. Hoyt, Bainbridge, N.Y., assignor to The Borden Company, a corporation of New Jersey No Drawing. Filed Nov. 26, 1957, Ser. No. 698,907

4 Claims. (Cl. 117—100)

This invention relates to bonding granular material.

The invention is particularly useful in bonding such granules as sand in making shell molds and cores to receive cast metal and will be first illustrated, therefore, in connection with this use.

In the early art of shell molding, powdered phenolic resin compound was mixed in substantially dry form with the sand to be molded. Complete uniformity was difficult to obtain. The non-uniformity led to imperfect mold surfaces and imperfect casting surfaces. Another defect of the dry mixes was the tendency of sand and resin to segregate upon being conveyed or blown onto or into a pattern.

Processes have been developed to improve the resin distribution by coating the individual sand grains with a solid resin film. The resin is converted to liquid condition by melting a thermoplastic acid-catalyzed resin and mixing with heated sand grains or, when lower temperatures were used, by applying the same resin type as a solution in volatile solvent, hexamethylene tetramine being added in either case to formulate a curable coating composition on the sand. The first of these methods requires operating temperatures generally above 150° C. with attendant equipment to produce and maintain such temperatures. The use of solvents as in the second method is attended by evaporating combustible mixtures under the hazardous conditions usually present in a foundry. A third method applies to a normally liquid acid catalyzed novolac resin to the sand and, by partially reacting with curing agent, usually hexamethylene tetramine, at elevated temperatures of 80 to 102° C., converts the liquid novolac resin to a solid resinous composition on the sand, as described in U.S. 2,706,188. In converting such a liquid acid catalyzed resin to solid form by partial reaction with hexamethylene-tetramine, it is necessary to employ a relatively viscous liquid and to control an exothermic reaction between the resin and hexamethylene tetramine, at the same time introducing heat. This leads to poor control over the melting point and chemical composition of the resultant resin film. A fourth method of coating sand with phenolic resin has been the use of a single stage, self-curing or alkali catalyzed phenolic resin. While this permits the use of relatively fluid aqueous solutions and obviates use of flammable solvents, the resulting coated sand is generally tacky, or, when mixed at elevated temperatures to force drying to solid condition, is partially cured and incapable of making strong shell molds.

The present invention provides for addition of a product of phenol and formaldehyde that, as admixed, is a thin and non-tacky satisfactorily stable liquid that may be considered a resin precursor. The invention provides also a process in which (1) the liquid addition product is coated on the sand while the liquid contains an alkali component that facilitates proper spreading of the liquid, even in small proportion, as a coating over the grains of sand, (2) the coated liquid is converted to an acid catalyzed thermoplastic phenol formaldehyde resin, hereinafter referred to as a novolac resin, by the addition of an acid, and (3) the whole then dried with continuous stirring, to give a product that may be stored and delivered to the place of use while still in free flowing condition. When mixed with hexamethylene-tetramine or like potential curing agent, the resulting mixture, although resembling foundry sand in blowing and flowing properties, may be formed into the desired cores or shells and hardened without the introduction of any water or other solvent that requires evaporation at the place of use of the sand and binder mixture.

The invention comprises sand and other particles coated with the liquid addition product and the herein described process of bonding granules.

As to materials, the granules used may be sand, Carborundum, glass or other impervious granular material.

The phenol used is ordinarily a commercial grade of phenol itself ($C_6H_5OH$) although there may be used cresol such as the mixed meta and para, xylenol rich in content of the 1-3-5 isomer, or commercial fractions of mixed cresols and xylenols.

The aldehyde used is ordinarily formaldehyde, supplied in any convenient form as in a commercial aqueous solution such as one containing about 37% of actual formaldehyde or as paraformaldehyde. Furfuraldehyde, acetaldehyde, and propionaldehyde are other aldehydes that are water soluble and phenol reactive with a catalyst and that illustrate the class which may be used.

The alkali used to catalyze the formation of the primary addition of the aldehyde and the phenol and promote subsequent coating of the sand is an alkali metal compound such as sodium or potassium hydroxide. Corresponding carbonates, if used, introduce problems because of carbon dioxide liberation by acids. Ammonium hydroxide, among other disadvantages, is not as effective per unit of cost as the caustic alkalies.

The acid used in converting the said addition product to novolac is a strong acid, suitably a mineral acid, of such strength as to give a pH not greater than 1.6 in N/10 aqueous solution at 25° C. Examples of acids that I use are the mineral acids hydrochloric, sulfuric, and phosphoric acids, these being particularly economical.

As the potential final hardening or curing agent, I know of no other material that is as satisfactory in all regards as hexamethylene-tetramine.

The proportion of the addition product, that provides the novolac intermediate in about equal amount and finally the cured resin binder, is varied according to the specific properties desired in the bonded product, as within the range 1–10 parts of the addition product for 100 of the sand. For most purposes 1–5 parts are adequate for a high strength product.

The ratio of the aldehyde to phenol used in making the addition product is usually within the range about 0.6 mole–0.85 mole for 1 phenol. In all cases there is a molar excess of the phenol over the aldehyde.

The acid applied to the sand coated with the liquid addition product is added in amount to establish a pH below 2, ordinarily below 1.6, and for best commercial results not above 1.3. Because of the buffering action of the sand, the amount of acid required is somewhat more than that needed to establish the same pH in the addition product alone.

The hexamethylenetetramine is added in amount usual for curing phenolic resins, as for instance 8–15 parts for 100 of the novolac on the dry basis.

Exceptions have been noted to conditions heretofore used for bonding foundry sand in the art of making shells and cores for metal casting. In addition, it is necessary, in making the liquid addition product or resin precursor, that the mixture of phenol and formaldehyde undergoing addition must be at a pH above 7. That is, the addition reaction must be alkali catalyzed. Also the temperature in that reaction must be kept below that of gelling and objectionable thickening of the product, as at 75° C. or lower. I obtain good results within the range 60°–70° C., a temperature below 60° C. causing the rate of addition to be objectionably slow for commercial practice.

The addition reaction is continued until the content of free formaldehyde ceases to fall rapidly and becomes practically constant, as at about 0.2%–2% of the amount of total formaldehyde used originally.

During the evaporation of water from the solution of the resulting addition product, as to concentration 80%–85% or so of non-volatile material, the temperature is maintained again below 75° C., the evaporation being conducted to advantage in vacuo.

Proceeding as described, I make an addition product that, after concentration as described, is a thin liquid nearly as fluid as water and, in a representative preparation, has a pH of 8–8.5. I consider that the material is high in content of hydroxy benzyl alcohols or methylol phenol monomer. Applied to the sand, the liquid does not advance in complexity (resinity) objectionably on standing.

The alkaline components of the concentrated liquids, such as residual alkali catalyst or by-products thereof, and the thinness and non-resinous nature of the liquid jointly contribute to the relative ease of coating the liquid addition product over the grains of sand, with a minimum proportion of the said liquid.

The sand is best mixed in warm condition with the addition product that is to provide the ultimate binder but at such temperature that the resulting sand and addition product mixture is not above about 75° C.

The rather difficult testing of pH of the mixture of sand and addition product, at the novolac formation stage, may be replaced by observation of the color of the mix. When the proper amount of acid has been added, to establish the desired low pH and convert the addition product to novolac, the mix becomes perceptibly lighter in color. When, on the other hand, the acid is insufficient in amount to cause the conversion to novolac and the pH remains above 2, for example, the color does not undergo such lightening and the addition product left on the sand behaves in that event as an incomplete single-stage resin that advances with age, the final result of its use being inferior bonding of the sand.

The invention will be further illustrated by description in connection with the following examples. In these examples and elsewhere herein proportions are expressed as parts by weight unless specifically stated to the contrary.

*Example 1*

The following materials were charged to a reactor equipped with agitator and reflux condenser, in the order given:

| Material: | Parts |
|---|---|
| Phenol, U.S.P. | 2380 |
| Formaldehyde, weight of 36.5% solution | 1642 |
| Caustic soda (dissolved in water to make 5 N solution), dry weight | 11.7 |

The formaldehyde proportion corresponds to slightly less than 0.8 mole for 1 mole of the phenol.

The charge was heated to 69° C. at which temperature an exothermic reaction started. Heating was discontinued but the temperature continued rising to 73° C. and then fell off to 68.5° C. in 1 hour.

5.95 parts by weight of additional caustic soda was then added, which raised the pH of the mix from 7.0 to about 8.5. Heating was carefully resumed and the temperature maintained at approximately 70° C. for a total of 5 hours. Analysis at this point indicated formaldehyde consumption of 98.6%.

Vacuum was then applied and water was distilled off at a pressure of about 3 mm. and a liquid temperature below 70° C. The product had a concentration of about 83% and had the power to dissolve 130% of its weight of water. This final or addition product was used as the addition product in treating sand as described herein.

*Example 2*

A muller was charged with the following materials added in the order given:

| Material: | Parts |
|---|---|
| Pennsylvania reference sand 8 N, heated to 200° C. | 4,000 |
| Final product from Example 1 | 175 |
| Hydrochloric acid, weight of solution 10 N | 13 |

After two minutes mixing, the temperature of the whole was 60° C. Mixing was continued for 30 minutes after which the product was discharged from the muller. After cooling to room temperature, the resulting free-flowing, dust-free coated sand was mixed with 15 parts of hexamethylenetetramine. "Dog-bone" test specimens were then formed on a hot pattern. After being cured in an oven at 400° C., these test specimens showed an average ultimate tensile strength of 405 p.s.i. on the Dietert testing machine. The sand-resin mix so prepared contained approximately 3.6% of resin.

*Example 3*

The procedure and composition of Example 2 are used except that the hexamethylenetetramine is added approximately 3 minutes after introducing the hydrochloric acid. The mulling is continued as before to mix and dry out the mass.

*Example 4*

The process of Example 3 is repeated with the modification that, before addition of the hexamethylenetetramine, sodium hydroxide solution is added to the mix in amount approximately to neutralize the acidity. The operation is then continued as in Example 3.

*Example 5*

The procedures and compositions of Examples 1 and 2 are used except that the phenol is replaced by an equimolecular proportion of any of the other phenols disclosed herein.

*Example 6*

The procedures and compositions of Examples 1 and 2 are followed except that the formaldehyde there used is replaced by commercial furfural in amount to provide approximately 20 moles of aldehyde and water is added in amount to make the total water content approximately equal to that in the composition tabulated in Example 1, the water being introduced before the initial reaction between the furfural and phenol is effected.

*Example 7*

The procedures and compositions of Examples 1 and 2 are used except that the formaldehyde is replaced by approximately 20 moles of acetaldehyde or propionaldehyde and water is added in amount to make the total approximately the same as that in the composition tabulated in Example 1, the water being introduced before the the initial reaction between the furfural and phenol is effected.

It is to be understood that it is intended to cover all changes and modifications of the examples of the invention herein chosen for the purpose of illustration which do not constitute departures from the spirit and scope of the invention.

I claim:

1. In coating impervious granular material selected from the group consisting of sand, Carborundum, and glass with a hardenable binder, the process which comprises warming an aqueous solution of a phenol, an aldehyde, and an alkali catalyst of condensation of the phenol and aldehyde at a temperature not above about 75° C. until a non-gelled, non-tacky, water soluble, alkali-catalyzed addition product of the phenol and aldehyde results and the content of the free aldehyde ceases to fall rapidly, the alkali being used in amount to establish the pH of the solution above 7, the phenol being selected from the group consisting of phenol, cresol and xylenol, the aldehyde being selected from the group consisting of formaldehyde, furfuraldehyde, acetaldehyde, and propionaldehyde, and the proportion of the aldehyde used being about 0.6–0.85 mole for 1 mole of the phenol, mixing the said addition product in aqueous solution with the said particles to form a coating thereover, applying to said coating an acid selected from the group consisting of hydrochloric, sulphuric, and phosphoric acids in amount to establish the pH of the resulting mixture at not above 2, maintaining the temperature of the particles with the acidified coating thereon at a temperature not above about 75° C. until the said addition product is converted to an acid catalyzed thermoplastic phenol formaldehyde resin, and drying and stirring the resulting mixture until a dry free-flowing granular product results.

2. The process of claim 1 in which said dry free-flowing granular product is admixed with hexamethylene tetramine as a potential hardener of the thermoplastic phenol formaldehyde resin.

3. The process of claim 1 in which the said particles are sand and the selected phenol is of the formula $$C_6H_5OH$$

4. The process of claim 2 in which the selected phenol is of the formula $C_6H_5OH$ and the said aldehyde is formaldehyde.

References Cited in the file of this patent

UNITED STATES PATENTS

| | | |
|---|---|---|
| 2,123,152 | Rivat | July 5, 1938 |
| 2,617,785 | Pritchett et al. | Nov. 11, 1952 |
| 2,706,188 | Fitko et al. | Apr. 12, 1955 |
| 2,715,114 | Huck | Aug. 9, 1955 |
| 2,806,832 | Drumm et al. | Sept. 17, 1957 |